Figure 1:
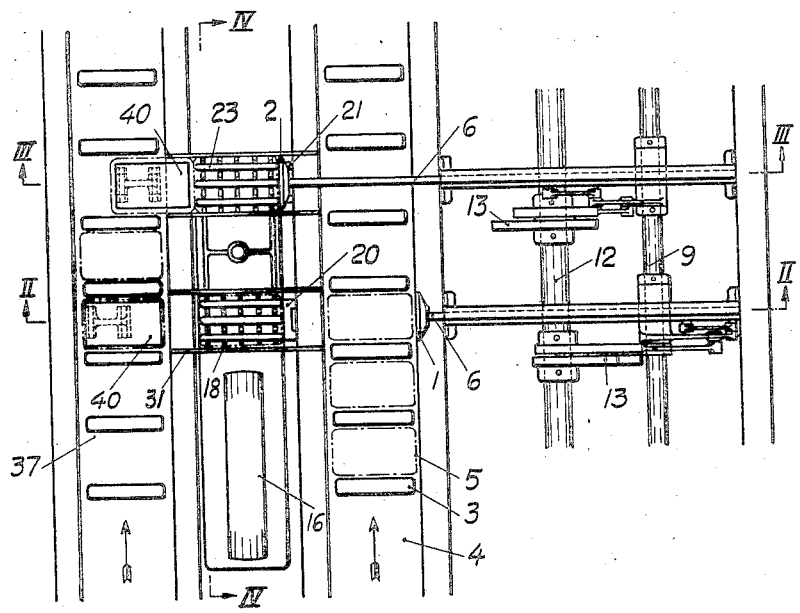

April 21, 1936. E. VON SEGEBADEN ET AL 2,038,458
WEIGHING MECHANISM
Filed June 25, 1934  3 Sheets-Sheet 1

Patented Apr. 21, 1936

2,038,458

UNITED STATES PATENT OFFICE 2,038,458

WEIGHING MECHANISM

Ernst von Segebaden, Drottningholm, and Gustaf Örström, Alsten, Sweden, assignors to Aktiebolaget Gerh. Arehns Mekaniska Verkstad, Stockholm, Sweden, a corporation of Sweden Application June 25, 1934, Serial No. 732,314
In Sweden July 1, 1933

11 Claims. (Cl. 265—27)

This invention relates to weighing mechanism and one object of the invention is to provide means for increasing the capacity of the weighing mechanism and for avoiding loss of time arising through idle running.

Another object of the invention is to utilize thoroughly the capacity of the weighing mechanism, that is, its working period so that said period is practically entirely utilized for proper weighing.

A further object of the invention is to enable increasing of the accuracy of the weighing operation.

Figure 2:
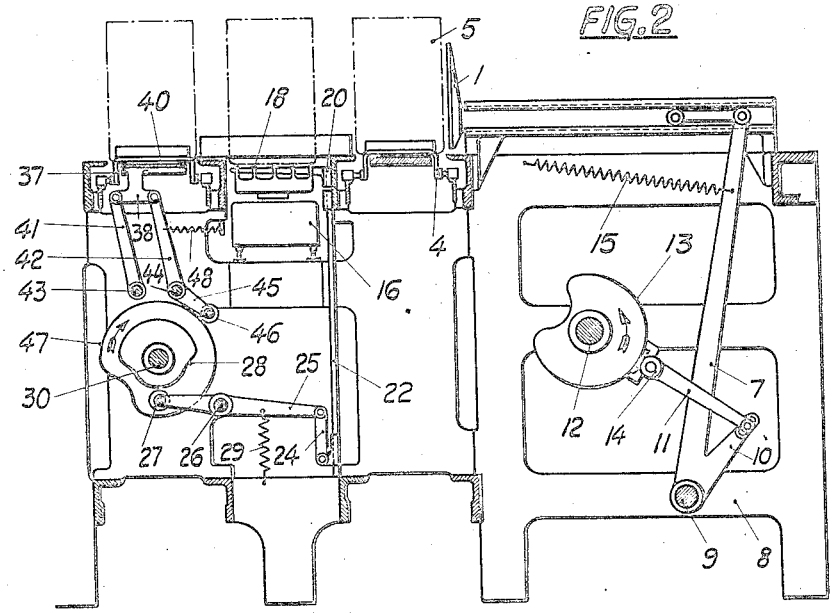
Figure 3:
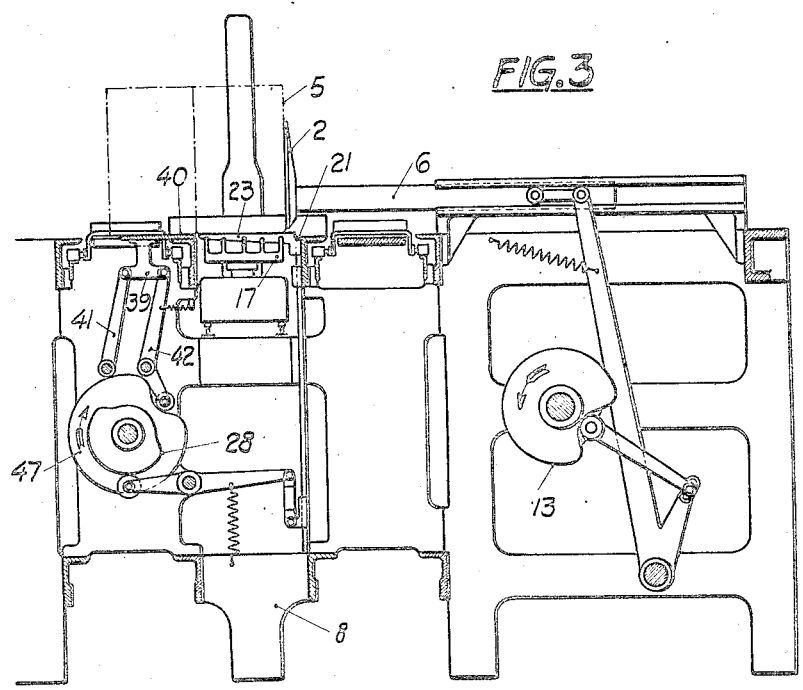
Figure 4:
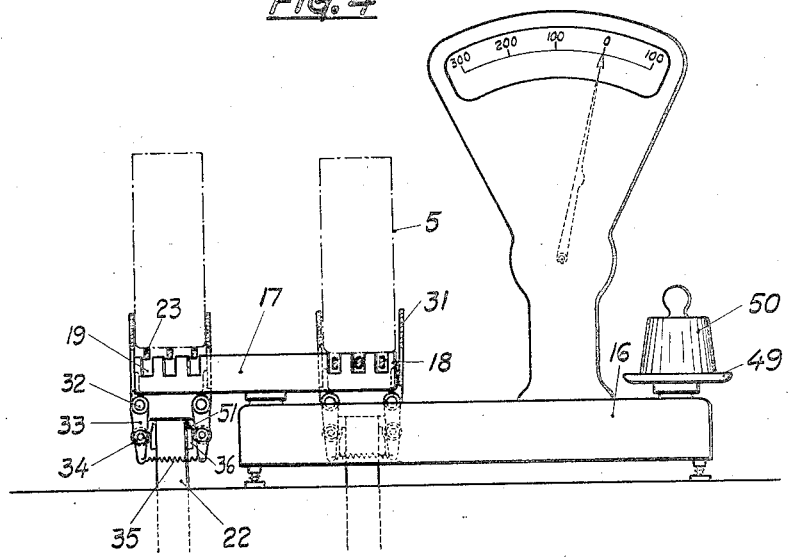
Figure 5:
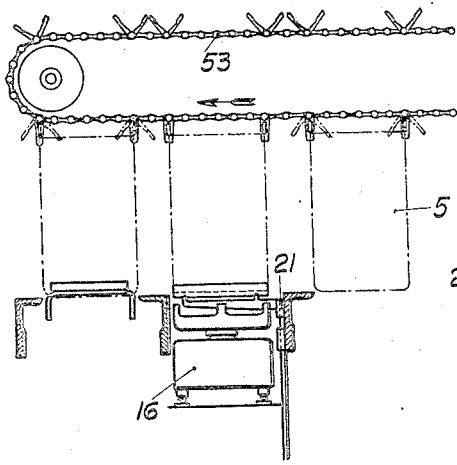
Figure 6:
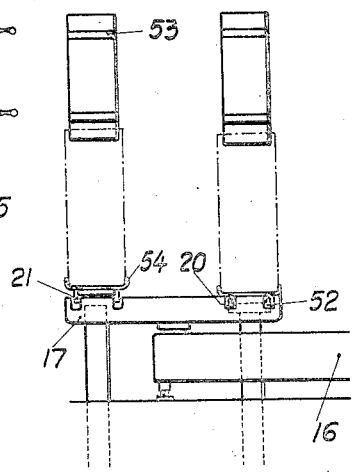

In the drawings accompanying and forming part of this specification,

Fig. 1 is a plan view of one embodiment of a mechanism according to the invention, Fig. 2 is a view on the line II—II of Fig. 1, Fig. 3 is a view on the line III—III of Fig. 1, Fig. 4 is a view on the line IV—IV of Fig. 1, Fig. 5 is an elevational view of a modified embodiment of the invention, and Fig. 6 is an elevational end view of the embodiment illustrated in Fig. 5.

Referring now in detail to the drawings: two pusher plates 1 and 2 respectively are juxtaposed at the side of a conveyor 4 having partitions 3, and adapted to convey bags 5 containing flour step by step into a position in front of said pushers. The distance apart of the pushers corresponds to the spacing of alternate carrying positions of the conveyor, that is, double the distance apart of two adjacent partitions of the conveyor. The pushers are each secured to a rod 6, each of which rods is pivotally connected to an arm 7 of double levers, which are pivotally carried by a rigid shaft 9 in the frame 8 of the apparatus. The second arms 10 of the levers are pivoted to links 11, which are actuated in a known manner by cam discs 13 secured to a driving shaft 12. Rollers 14 on the links 11 are forced against the peripheries of the cam discs by tension springs 15. Said springs connect the frame 8 with the arms 7. Both cam discs 13 for driving the pusher plates have a relative displacement of 180 degrees. The driving mechanism of the shaft 12 and the conveyor 4 respectively are interconnected in such manner that the conveyor will move two steps, each corresponding to the relative distance of two adjacent partitions 3 when the shaft 12 performs one revolution.

At the opposite side of the conveyor 4 and in front of the pushers 1 and 2 are provided scales 16, and in front of each pusher there is arranged a carrier. Each scale is provided with a receiver or scale-pan 17 having beams 18 spaced by slots 19. The carriers consist of elevator members 20 and 21, each secured to a vertical rod 22 slidingly guided in the frame 8. Each elevator member is provided with three fingers 23, which will pass freely through the slots 19. For imparting to the rods 22 movements up and down a link 24 is pivoted to each of them, said link being also pivoted to one end of a lever 25 fulcrumed on a shaft 26. The other end of the lever carries a roller 27, which is forced against the periphery of a cam 28 by a spring 29. The spring 29 connects the lever arm 25 with the frame 8. Both cams 28 are secured to a driving shaft 30 which rotates at the same velocity as the shaft 12, and said cams have a relative angular displacement of 180 degrees.

At opposite sides of each elevator member there are provided plates 31, for the purpose of adjusting the position of the bag relative to the carrier member. Each plate 31 is pivoted on a pin 32 in the frame 8 and has a downwardly projecting arm 33, which carries a roller 34. The ends of the arms 33 are interconnected by means of tension springs 35, whereby the rollers are pressed against cams 36 on the sliding rod 22.

At the side of the conveyor 4 opposite to the scale 16 there is provided another conveyor 37, constructed and driven in the same manner as the conveyer 4. Between the scale and the conveyor 37 in front of each of the members 20 and 21 transferring members 38 and 39 are provided, each of which is equipped with a plate 40. Each transferring member is connected to two arms 41 and 42, which are pivotally journalled on shafts 43 and 44 in the frame 8. The arm 42 constitutes together with another arm 45 a double-armed lever. Each arm 45 carries a roller 46 which is forced against the periphery of a cam 47 by means of a spring 48, said spring being connected to the arm 42 and to the frame 8. The cams 47 are secured to the shaft 30 and have a relative angular displacement of 180 degrees. A scale-pan 49 is provided to support the counter-weight 50.

In operation of the mechanism now described and illustrated, a bag 5 containing, for example, flour is moved by the conveyor 4 into a position in front of the pusher 1. It is thereby provided that the scale-pan 17 be empty and that the carrier 20 will occupy its uppermost position so that its upper surface projects above the scale beams 18. Thus the pusher 1 will transfer a bag to said carrier which will then rapidly descend into a bottom position where the bag is caught by the scale-pan so that it will rest upon the beams 18 thereof. Simultaneously with the carrier 20 being rapidly descended into a bottom position the carrier 21 automatically ascends to an elevated position corresponding to that previously occupied by the carrier 20. While the scale-pan is descending the conveyor 4 advances one step and after said conveyor has been arrested the pusher 2 will transfer another bag to rest upon the carrier 21. Thereby the first bag rests on the descending scale-pan during a period of time. At the end of said period the carrier 20 again ascends rapidly, while the carrier 21 performs a corresponding downward movement. At the moment when both carriers 20 and 21 are at the same height the bag will be caught by the beams of the scale-pan and on further ascending of the carrier 20 and descending of the carrier 21 the bag just supplied will be subjected to the same weighing operation as previously described. After the carrier 20 has attained its top position, on a level with the conveyors, it will be arrested and then the carrier 21 occupies its bottom position of rest. During the bag exchange or after said exchange has been effected the conveyor 4 advances one step and the pusher 1 transfers another bag to the carrier 20. Said bag replaces a bag already weighed and resting on said carrier so that the bag last mentioned will partly rest on the plate 40, that is, it will not have been completely transferred to the conveyor 37 which is now momentarily at rest. Such transferring is effected by swinging the arms 41 and 42 over to the position illustrated in Fig. 2, thereby lifting the bag over to the conveyor 37.

The plates 31 are swung outwards when the corresponding carrier has been lowered for then the spring may freely move the rollers 34 inwards until they engage a curvature 51 of the cams 36. On moving the carrier upwards the plates approach each other against the tension stresses of the spring 35 and thereby a bag 5 having been transferred to the carrier will obtain an exact position on said carrier. On lowering the carrier, the plates 31 are swung outwards so that the bag will freely rest upon said carrier.

The treatment of the bag as now described is alternately effected over the carriers 20 and 21 respectively in such manner that one of said carriers will always support a bag to be weighed or having been weighed and one of the carriers will always lower a bag to be weighed, whilst the other carrier lifts a bag already weighed for removing said bag from the scale pan. The bags will be rapidly but nevertheless softly applied to the scale pan since the applying movements are comparatively short and will not include any sliding movements, and no time will be lost when bringing the bags into a primary position relative to the receiver, even though this might be effected slowly, possibly manually, for during this period another object is being weighed. Thereby the idle period is reduced to the very small period of time required for elevating a weighed bag to such a height that the both carriers are on a level with one another. Said level may be regulated as desired for instance by adjusting the carriers 20 and 21 on the sliding rods 22. The movements of the carriers may also be executed in such manner that the bag exchange will be effected near the bottom turning positions of the carriers or in the proximity of said positions. The movements of the scale-pan are short and therefore the exchange movements are at any rate rapidly executed.

According to Fig. 5 and 6 the bags are supported by plates 54 which rest during the weighing operation upon the scale-pan and they are lifted from the scale-pan after finishing the weighing by means of the carriers 20 and 21 respectively, which are in this case provided with ridges 52. Instead of utilizing the pushers an intermittently moved suspension conveyor 53 may be provided above each carrier, and the bag will be dropped onto a plate 54 which is thereafter lowered to rest on the scale-pan. Possibly the bag may be directly dropped onto a corresponding carrier.

We claim:

1. The combination with weighing mechanism having an article receiver, of a plurality of juxtaposed article carriers, and means to alternately lower said carriers in timed cooperation to deposit articles to be weighed on said receiver.

2. The combination with weighing mechanism having an article receiver, of a plurality of juxtaposed, vertically movable article carriers, and means to alternately move said carriers in timed cooperation to deposit articles to be weighed on said receiver and thereafter lift the weighed articles from said receiver.

3. The combination with weighing mechanism having an article receiver, of a plurality of juxtaposed article carriers, and means to move said carriers in timed cooperation up and down past one another to receive articles to be weighed and deposit said articles on said receiver and thereafter lift weighed articles from said receiver.

4. The combination with weighing mechanism having an article receiver, of a plurality of juxtaposed article carriers, and means to alternately move said carriers in timed cooperation up and down between top positions and bottom positions to receive articles to be weighed and deposit said articles on said receiver, said means being arranged to retain said carriers at said positions for approximately the entire period of a cycle of their operation.

5. The combination with weighing mechanism having an article receiver, of a plurality of juxtaposed article carriers, and means to alternately move said carriers in timed cooperation up and down between top positions and bottom positions to receive and deposit articles to be weighed on said receiver, said means being arranged to move the carriers past one another in the proximity of said bottom positions.

6. The combination with weighing mechanism having an article receiver, of a plurality of juxtaposed article carriers, and means to alternately lower said carriers in timed cooperation to deposit articles to be weighed on said receiver, said carriers being adjustably connected to said means.

7. The combination with weighing mechanism having an article receiver, of a plurality of juxtaposed article carriers, and means to alternately lower said carriers in timed cooperation to deposit on said receiver articles to be weighed, said carriers having spaced members and said receiver having passages arranged to permit said spaced members to move up and down through them.

8. The combination with weighing mechanism having a pan receiver, of a plurality of juxtaposed pan carriers, pans for receiving articles, said pans loosely resting on said carriers, and means to alternately lower said carriers in timed cooperation to deposit said pans on said receiver.

9. The combination with weighing mechanism having an article receiver, of a plurality of juxtaposed article carriers, means to alternately lower said carriers to deposit articles to be weighed on said receiver, an article conveyor juxtaposed to said carriers, and a plurality of pushers operative in front of said carriers to alternately transfer articles from said conveyor to said carriers, each pusher being arranged to cooperate with a corresponding carrier.

10. The combination with weighing mechanism having an article receiver, of a plurality of juxtaposed article carriers, means to alternately lower said carriers to deposit articles to be weighed on said receiver, and article transferring members operative to lift articles from said carriers and transport them aside.

11. The combination with weighing mechanism having an article receiver, of a plurality of juxtaposed article carriers, means to alternately lower said carriers to deposit articles to be weighed on said receiver, a suspension conveyor for articles to be weighed extending above a carrier for dropping articles onto said carrier.

ERNST von SEGEBADEN.
     GUSTAF ÖRSTRÖM.